(12) United States Patent
Debris et al.

(10) Patent No.: US 10,974,437 B2
(45) Date of Patent: Apr. 13, 2021

(54) METHOD FOR UNBLOCKING THE MOVEMENT OF HOLLOW BODIES IN A CHUTE CONVEYOR

(71) Applicant: SIDEL PARTICIPATIONS, Octeville-sur-Mer (FR)

(72) Inventors: Anthony Debris, Octeville-sur-mer (FR); Eric Mazo, Octeville-sur-mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 218 days.

(21) Appl. No.: 16/303,436

(22) PCT Filed: May 23, 2017

(86) PCT No.: PCT/FR2017/051275
§ 371 (c)(1),
(2) Date: Nov. 20, 2018

(87) PCT Pub. No.: WO2017/203160
PCT Pub. Date: Nov. 30, 2017

(65) Prior Publication Data
US 2020/0316840 A1     Oct. 8, 2020

(30) Foreign Application Priority Data
May 25, 2016  (FR) ....................... 1654684

(51) Int. Cl.
*B29C 49/42*     (2006.01)
*B65G 47/14*     (2006.01)
*B65G 47/52*     (2006.01)

(52) U.S. Cl.
CPC ...... *B29C 49/4205* (2013.01); *B65G 47/1464* (2013.01); *B29C 2049/4231* (2013.01);
(Continued)

(58) Field of Classification Search
CPC ............... B65G 47/14; B65G 47/1464; B65G 47/1428; B65G 47/1435; B65G 43/08; B65G 47/256; B29C 49/4205
(Continued)

(56) References Cited

U.S. PATENT DOCUMENTS 5,549,189 A * 8/1996 Martisala ........... B65G 47/1457
                                                      198/380
6,276,514 B1   8/2001 Cochin
(Continued)

FOREIGN PATENT DOCUMENTS

EP   1 690 813 A1   8/2006
EP   2 065 320 A1   6/2009
(Continued)

OTHER PUBLICATIONS

International Search Report, dated Aug. 4, 2017, from corresponding PCT/FR2017/051275 application.

*Primary Examiner* — James R Bidwell

(57) ABSTRACT

Disclosed is a method for unblocking the movement of hollow bodies travelling in a line in a conveyor, including: a guiding chute in which each hollow body is intended to take up a freely suspended position; a component for continuously driving hollow bodies into the chute in a direction of movement; a hollow body being likely to take up a position in which it is stuck against a stationary surface of a member that complements the chute and thus to block the movement of the hollow bodies that build up behind same. The method includes an unblocking step which consists of applying an unblocking pulse to the hollow bodies of the blocked line against the direction of movement in order to move the blocking hollow body away from the stationary surface and to allow the blocking hollow body to swivel into the freely suspended position thereof in the chute.

20 Claims, 7 Drawing Sheets

(52) U.S. Cl.
CPC .... *B65G 47/525* (2013.01); *B65G 2201/0247* (2013.01); *B65G 2203/042* (2013.01)

(58) Field of Classification Search
USPC .......................................................... 198/392
See application file for complete search history.

(56) References Cited

U.S. PATENT DOCUMENTS

| | | | |
|---|---|---|---|
| 8,522,956 B2* | 9/2013 | Tanner | B65G 47/256 198/395 |
| 8,640,852 B2* | 2/2014 | Seki | B07C 5/34 198/392 |
| 9,821,963 B2* | 11/2017 | Gaille | B65G 47/34 |
| 2004/0109747 A1* | 6/2004 | Charpentier | B65G 47/1428 414/403 |
| 2007/0108018 A1* | 5/2007 | Charpentier | B65G 47/256 198/434 |
| 2011/0108468 A1 | 5/2011 | Tanner | |
| 2015/0041282 A1 | 2/2015 | Seitel et al. | |
| 2015/0258727 A1* | 9/2015 | Heller | B29C 49/4205 198/373 |
| 2017/0320670 A1 | 11/2017 | Fevre et al. | |

FOREIGN PATENT DOCUMENTS

| | | |
|---|---|---|
| EP | 2 221 261 A1 | 8/2010 |
| EP | 2 554 356 A1 | 2/2013 |
| FR | 2 772 359 A1 | 6/1999 |
| JP | 2014 076618 A | 5/2014 |
| WO | 2016/075389 A1 | 5/2016 |

\* cited by examiner

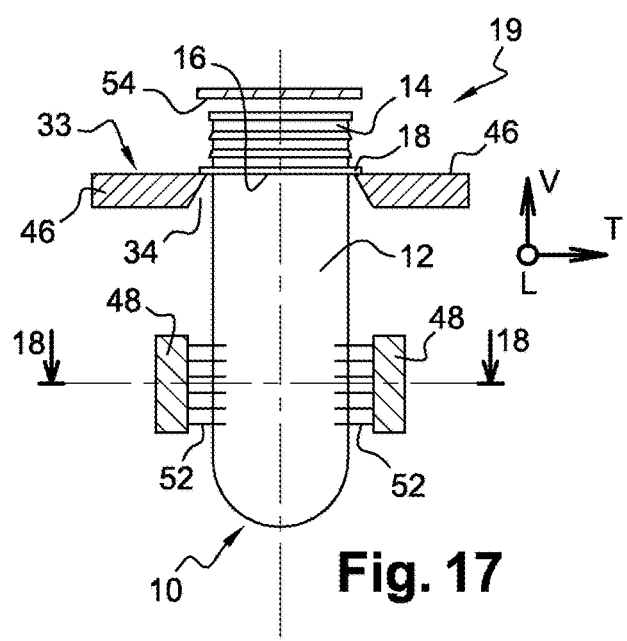
Fig. 17
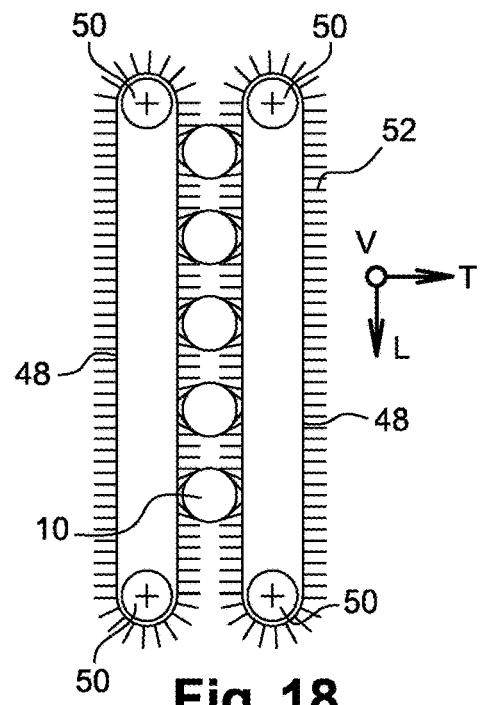
Fig. 18
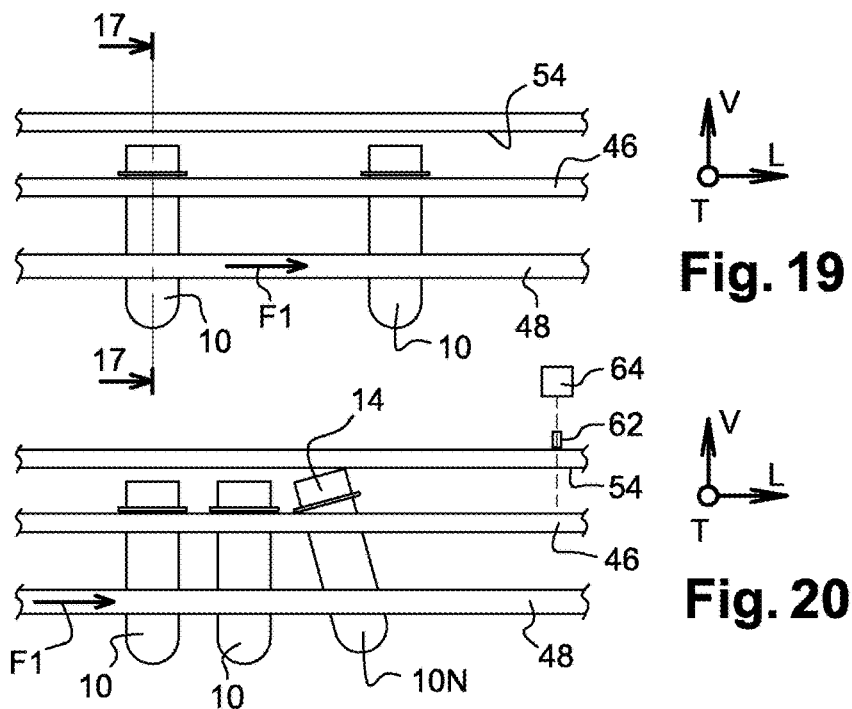
Fig. 19
Fig. 20
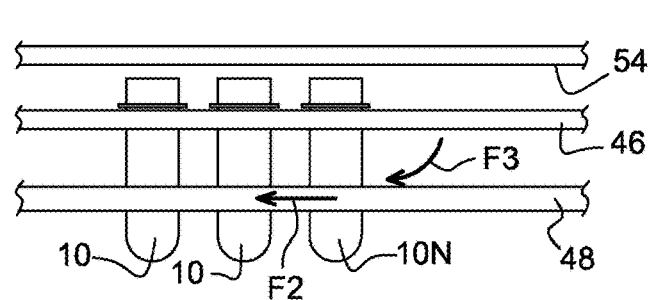
Fig. 21

METHOD FOR UNBLOCKING THE MOVEMENT OF HOLLOW BODIES IN A CHUTE CONVEYOR

TECHNICAL FIELD OF THE INVENTION

The invention relates to a method for unblocking the movement of hollow bodies that are moving in a row in a chute of a conveyor.

More particularly, the invention relates to a method for unblocking the movement of hollow bodies, particularly preforms made of thermoplastic material, moving in a row in a conveyor having:
- a guiding chute in which each hollow body is intended to occupy a freely suspended position;
- means for continuously driving the hollow bodies along the chute in a direction of travel;
- a hollow body that can occupy a position in which it finds itself jammed against a blocking surface of a supplemental element of the chute and thus can cause the blocking of the movement of the hollow bodies that accumulate behind it.

TECHNICAL BACKGROUND OF THE INVENTION

The invention is particularly applicable to an installation for manufacturing or processing containers, such as bottles, by forming preforms made of thermoplastic material. In the following description and in the claims, the expression "hollow bodies" will refer interchangeably to a container or to a preform or to an intermediate container being formed.

The use of chute conveyors is well known in this type of installation. These conveyors are designed to move hollow bodies in a row to convey them to a subsequent conveying device, for example a thermal conditioning station, a transfer wheel, or a processing station.

In a known way, such conveyors have a chute equipped with a lengthwise channel along which the hollow bodies travel one after the other. Each hollow body, for example a preform, has a radially protruding collar which is positioned near the neck of the hollow body. Normally, the collar rests on both sides of the channel, particularly on a stationary rail, while the body of the hollow body hangs freely under the influence of its weight across the channel. The hollow body is thus in a freely suspended position in the chute, corresponding to a correct position.

In such conveyors, the hollow bodies are not kept from one another, to ensure that two successive hollow bodies can consequently collide.

The sliding of the hollow bodies along the chute is caused by drive means. The drive means can be active means, such as motorized means, or passive means, for example inclination of the chute making it possible to have the hollow bodies slide by gravity.

With regard to mass-production or processing installations, such conveyors are designed to move the hollow bodies at high speed. To guarantee that each hollow body can be transferred automatically and smoothly to the subsequent transport device, it is preferable to ensure that all the hollow bodies carried by the conveyor occupy their correct position (the freely suspended position) before reaching a downstream end portion of the chute. For this purpose, a supplemental element is generally associated with the chute either to sort out the hollow bodies that are not occupying their correct position, or to keep the hollow bodies which are already there in their correct position.

By way of nonlimiting examples, the supplemental element can be arranged in two separate or complementary configurations.

In a first configuration, the supplemental element is a part comprising a stationary surface, known as a sorting surface, which has the function of sorting out each hollow body occupying an incorrect position by blocking its passing by contact with a portion of said hollow body against the sorting surface. The hollow body then occupies a so-called blocking position in which the hollow body is jammed against the sorting surface and can, to a certain extent, block the movement of the following hollow bodies.

In a second configuration, which will be detailed below, the supplemental element is a part, for example consisting of a profile following the chute, comprising a stationary surface, known as a retention surface, which has the function of making it possible for the hollow bodies that occupy their correct position in the chute to stay there all along their path in the downstream end portion of the chute. When they are correctly positioned, the hollow bodies rest under the influence of their weight on both sides of the channel, without there being any contact between a portion of the hollow body and the retention surface.

However, it can happen that the hollow bodies are propelled by a swinging motion, generally in a longitudinal plane but sometimes in a transverse plane. This swinging motion can be caused by means for driving the hollow bodies or else by colliding between adjacent hollow bodies in the line. In case of too much swinging, a portion of a hollow body can come into contact with the stationary surface, for retention. Normally, the hollow body under the influence of gravity comes back to its freely suspended position. However, in some cases, the hollow body becomes jammed against the stationary surface while being inclined. It then occupies a blocking position in which its sliding is interrupted and in which it blocks the movement of the following hollow bodies which then accumulate against said hollow body.

In any case, a hollow body thus jammed and stopped by a stationary surface, whether it be for sorting or for retention, of a supplemental element blocks the movement of the following hollow bodies which accumulate against one another behind it. In the description below, a hollow body that is thus jammed and stopped will be referred to as a "blocking hollow body."

The hollow body, as soon as it is jammed, is subject to a continuous pushing force against the stationary surface due to the drive means; said pushing force thus prevents this blocking hollow body from becoming unjammed by itself under the influence of gravity when its position would permit it.

Further, the hollow bodies that are accumulated behind the blocking hollow body exert an additional pushing force on it in the direction of the stationary surface due to the drive means. This has the effect of intensifying the jamming of the blocking hollow body against the stationary surface.

To resolve these situations, it is known to resort to the intervention of an operator who is transferred to unjam the blocking hollow body manually.

However, such a solution is not fast enough for a mass-production manufacturing installation.

Further, such a solution requires the presence of an operator dedicated to this task, which occurs randomly and unpredictably.

It has also been proposed to equip the chute with a trap door making it possible automatically to eject the blocking hollow bodies when an interruption of the travel of the hollow bodies is detected, for example by means of an optical sensor. Such a solution is functional for the case of hollow bodies blocked by a sorting surface.

However, such a solution involves recovering the hollow body or bodies which are ejected from the chute by the trap door. These hollow bodies can then be discarded or recycled by putting them back upstream into the flow of hollow bodies. In both cases, such an ejection operation involves time for transporting and for recovery of the ejected hollow bodies.

The document US2015/0041282 describes a device for supplying products such as bottles or the like comprising a rotating bowl. The products are positioned against an exterior guide as a result of the centrifugal force generated by the rotation of the bowl. The operation of this type of device can cause blockages of products. Consequently, the device is equipped with unblocking devices which make it possible to prevent blockages and to return the device to operation such as a reversal of the rotation of the bowl, a jet of compressed air or the retracting of a guide.

In addition, such a solution is not applicable in the case of a hollow body occupying its freely suspended position and finding itself then jammed by swinging against a retention surface. In this case, the jamming of the hollow body does not necessarily take place in the area of an ejection trap door and it is then necessary to resort to the intervention of an operator.

BRIEF SUMMARY OF THE INVENTION

The invention proposes a method for unblocking the movement of hollow bodies made of thermoplastic material, traveling in a row in a conveyor having:
- a guiding chute in which each hollow body is intended to occupy a freely suspended position; the chute comprising two parallel stationary rails between which each hollow body is received in its freely suspended position;
- means for continuously driving the hollow bodies along the chute in a direction of travel;
- a hollow body that can occupy a position in which it finds itself jammed against a stationary surface of an element that is supplementary to the chute and thus can be a jammed first hollow body causing the blocking of the movement of the hollow bodies that accumulate behind the jammed first hollow body;
- characterized in that it has an unblocking step which consists in applying an unblocking pushing force to the hollow bodies of the blocked line against the direction of travel to push aside the blocking hollow body relative to the stationary surface and to make it possible for the jammed first hollow body to swing to its freely suspended position in the chute.

Such a method makes it possible in particular to avoid, for a portion of the blocking cases, resorting to the transfer of an operator or proceeding to the ejection of the hollow body. The unblocking of a blocking hollow body according to the method of the invention actually makes it possible to keep the blocking hollow body in the flow of hollow bodies when its blocking position allows it. The pushing force can be remotely controlled by the operator without it being necessary to be transferred to the portion of the machine where the problem is occurring. As will be read farther on, it can be triggered automatically.

According to other characteristics of the invention:
- the pushing force is produced by a reversal of the direction of operation of the drive means;
- the method has a prior step for detection of the blockage of the movement of the hollow bodies, by means of a sensor for sensing the passing of the hollow bodies, and the unblocking pushing force is triggered automatically when a blockage is detected by the sensor.
- the hollow bodies are preforms, and the conveyor consists of a device for aligning in a row and for uprighting preforms that have a centrifuge bowl having a horizontal circular plate rotating around a vertical axis;
- the chute having a stationary peripheral rail that retains the preforms projected by the centrifugal force and a radially dedicated channel between the rail and a peripheral edge of the plate to receive each preform in its freely suspended position between the rail and the peripheral edge of the plate;
- a sorting surface that is positioned in the bowl relative to the chute to prevent by a stop the passing of preforms that do not occupy a freely suspended position;
- the means for initiating movement consist of the rotating plate, the unblocking pushing force being triggered by reversal of the rotation of the plate when a preform is jammed against the sorting surface to make it possible for it to swing in the channel in a freely suspended position;
- the conveyor consists of a chute having two parallel stationary rails between which each hollow body is received in its freely suspended position, and the chute is associated with a stationary surface that consists of an upper retention surface that extends above the necks of the hollow bodies;
- the drive means consist of at least one strip of brushes moving parallel to the chute and whose bristles push the hollow bodies toward the direction of travel, and in that the unblocking pushing force is achieved by reversing the direction of movement of the brush strips during the unblocking step;
- the conveyor consists of a chute having two parallel stationary rails between which each hollow body is received;
- the unblocking pushing force is achieved by blowing jets of compressed air on a portion of the hollow bodies against the direction of travel of the hollow bodies using a first ramp of blowing nozzles that is parallel to the chute;
- the rails are inclined to make it possible for the hollow bodies to slide toward the bottom of the chute under the influence of gravity;
- the movement means consist of a second ramp of nozzles for blowing jets of compressed air on the hollow bodies toward the direction of travel, the ramp being parallel to the chute.

BRIEF DESCRIPTION OF THE FIGURES

Other characteristics and advantages of the invention will be brought out in the course of reading the following detailed description for the understanding of which reference will be made to the accompanying drawings in which:

FIG. 17 is a cutaway view along the cutting plane 17-17 of FIG. 19 which represents a preform arranged in a conveyor able to use the method implemented according to a second embodiment of the invention;

FIG. 18 is a cutaway view along the cutting plane 18-18 of FIG. 17 which represents brush bands driving preforms in movement in a direction of travel in the chute of the conveyor;

FIG. 19 is a side view which represents two preforms moving in a row in a direction of travel in the chute of the conveyor of FIG. 17;

FIG. 20 is a view similar to that of FIG. 19 which represents a preform in a blocking position in which it is jammed against a retention surface and which blocks the movement of the following preforms, the brush bands pushing the preforms in the direction of travel;

FIG. 21 is a view similar to that of FIG. 20 in which the brush bands move in a direction that is inverse to that of the travel to separate the preform in blocking position from the retention surface to allow it to swing toward a freely suspended position;

DETAILED DESCRIPTION OF THE FIGURES

In the following description, elements having an identical structure or comparable functions will be referred to by the same references.

In the description below, the following local orientations for each hollow body will be adopted in a nonlimiting way:
longitudinal "L" which is directed horizontally in the direction of travel of the hollow bodies;
vertical "V" directed upward in the reverse direction of the Earth's gravity;
transverse "T" directed orthogonally to the longitudinal "L" and vertical "V" directions.

The installations for manufacture of containers by forming, for example by blow molding or by stretch blow molding, of preforms made of thermoplastic material are equipped with conveyors that are designed to move hollow bodies in a row to convey them to a following conveying device, for example a transfer wheel or a processing station.

In a known way, certain types of conveyors have a chute equipped with a lengthwise channel along which the hollow bodies travel one after the other by sliding freely.

Each hollow body has a body that is open axially by a neck. A radial projecting support surface is positioned near the neck of the hollow body.

Figure 1:
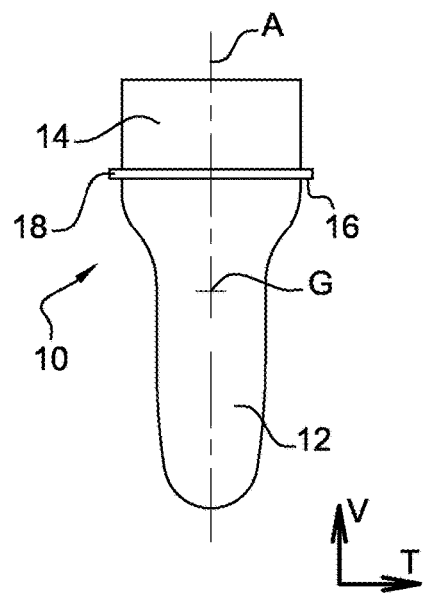
FIG. 1 is a front view which represents a preform.
Figure 2:
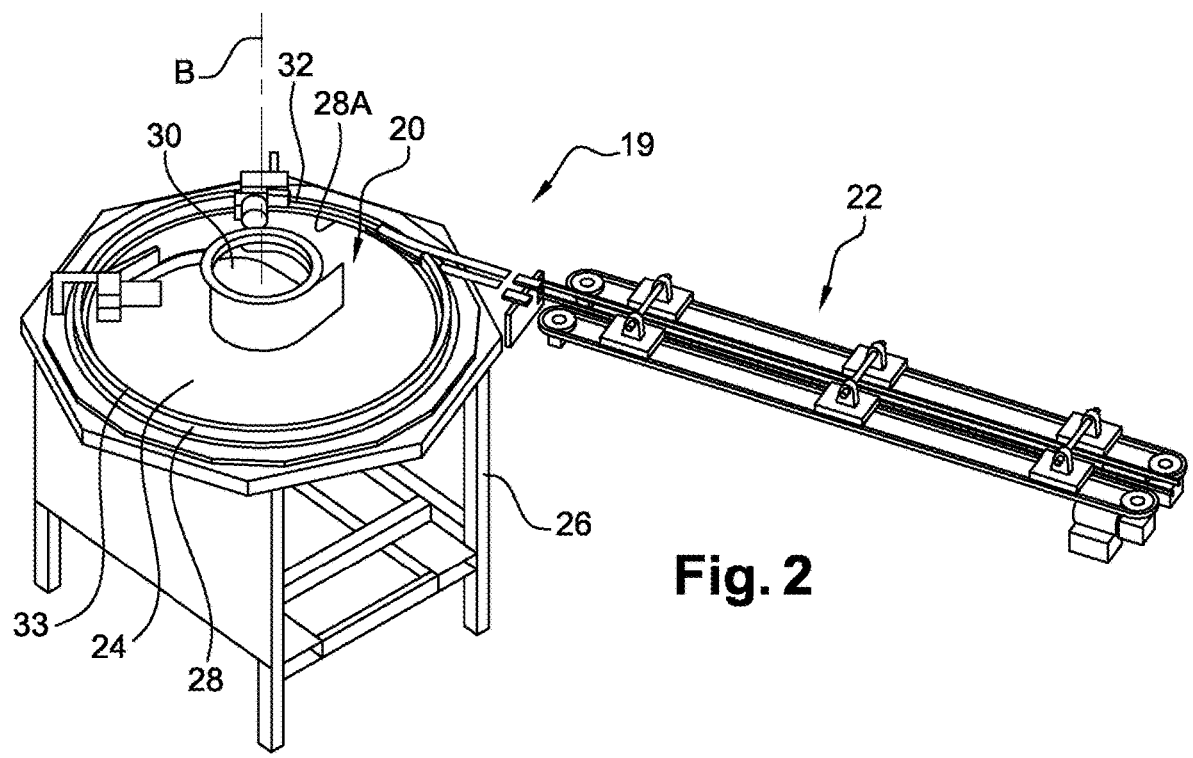
FIG. 2 is a view in perspective which diagrammatically represents a device for aligning and uprighting preforms having a conveyor able to use the method implemented according to a first embodiment of the invention.
Figure 3:
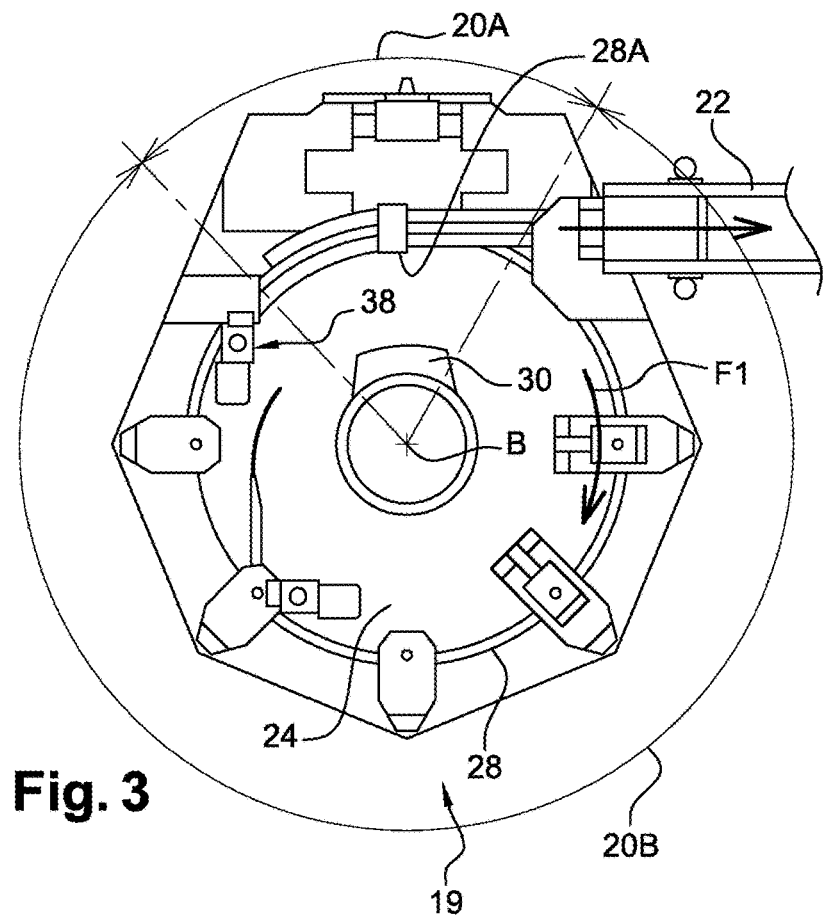
FIG. 3 is a top view which represents a centrifuge bowl of the device of FIG. 2.

An example of a hollow body formed by a preform 10 is illustrated in FIG. 1. Such a preform 10 is made of thermoplastic material, here, of PET. It is traditionally obtained by injection molding. It has a shape that is approximately axisymmetrical around a main axis "A" depicted vertically in FIG. 1.

The preform 10 has an elongated tube-shaped body 12 along the main axis "A" having a closed axial end and having at its opposite end, depicted at the top in FIG. 1, a neck 14 that is axially open.

The preform 10 also has an annular support surface 16 which is oriented axially toward the closed end of the preform 10, and which projects radially relative to the rest of the body 12. The term "annular" signifies that the support surface 16 goes around the preform 10 either continuously, or in a non-continuous manner. In this latter case, the annular surface 16 is, for example, made of disjointed segments which are nevertheless close enough together to ensure that the preform 10 can be supported between two diametrically opposite supports regardless of the position of the preform 10 around its main axis.

In the example represented, the base of the neck 14, at the junction with the body 12, has a collar 18 which extends projecting radially in relation to the rest of the preform 10. The lower face 16 of the collar 18 thus forms said support surface 16. The collar 18 here is formed as an integral part of the neck 14 and the body 12.

As a variant, the collar can be positioned elsewhere than at the base of the neck 14, for example in the area of the rim.

According to another variant, the support surface 16 consists of, for example, a lower surface of a screw-thread of the neck 14.

According to still another variant, the support surface is slipped onto the hollow body, for example by means of a cap.

Furthermore, the center of gravity "G" of the preform 10 is located under the support surface 16 with reference to FIG. 1. Thus, a preform 10 supported by its support surface 16 while resting on two diametrically opposite supports will naturally orient, by gravity, neck 14 upward.

The example represented in FIG. 1 is nonlimiting. It will be understood that the device and the associated method are intended to be applied to any type of hollow body having a support surface 16 that is radially projecting in relation to the rest of the body 12, and having a center of gravity "G" that is offset axially toward the body relative to said support surface 16.

Defined is a freely suspended position of the hollow body in the chute in which the collar 18 rests by its support surface 16 on both sides of the channel, while the body of the hollow body hangs freely under the influence of its weight across the channel.

The sliding of the hollow bodies along the chute is caused by drive means. As will be explained in more detail below, the drive means can be active means, such as motorized means, or passive means, for example the inclination of the chute allowing the hollow bodies to slide by gravity.

As a variant, the slide is delimited by two synchronized rolling bands which convey the hollow body.

To guarantee that each hollow body can be transferred automatically and smoothly to the following conveying device, it is preferable to ensure that all the hollow bodies conveyed by the conveyor maintain their freely suspended position before reaching a downstream end section of the chute. For this purpose, in a known way, a supplemental element comprising at least one stationary surface is associated with the chute.

In a first configuration, which will be described in detail in the first embodiment of the invention, the stationary surface of the supplemental element is a sorting surface which has the function of blocking the passing of the hollow bodies that occupy an incorrect position by contact with a portion of said hollow body against the sorting surface and of preventing it from reaching the downstream end of the chute. The hollow body then occupies a so-called blocking position in which the hollow body is jammed against the sorting face and in which it blocks the movement of the following hollow bodies.

In a second configuration, which will be detailed in the second and third embodiments, the stationary surface of the supplemental element is a retention surface which has the function of guaranteeing that the hollow bodies that already occupy their freely suspended position in the chute will remain in this position all along the downstream end section of the chute. Actually, it can happen that a hollow body is driven by a swinging movement, generally in a vertical longitudinal plane. This swinging is caused by, for example, drive means or else by colliding with an adjacent body in the row. The retention surface makes it possible to prevent the hollow body from leaving the chute in case of too extensive swinging of the hollow body by contact of a portion of the hollow body with the retention surface. Nevertheless, in some cases, the hollow body finds itself jammed against the retention surface in a blocking position for the following hollow bodies of the row and becomes a blocking hollow body.

In these two configurations, a hollow body that is thus stopped by the stationary surface blocks the movement of the following hollow bodies which accumulate against one another behind this hollow body stopped by the stationary surface.

The blocking hollow body is pushed continuously against the stationary surface under the influence of the drive means, which thus prevents it from unjamming itself under the influence of gravity when its position would permit it.

Furthermore, the hollow bodies that are accumulated behind the blocking hollow body exert an additional pushing force on it in the direction of the stationary surface under the influence of the drive means. This has the effect of reinforcing the jamming of the hollow body against the stationary surface.

To eliminate this problem without ejecting the hollow body from the row and without having an operator intervene to act manually directly on the blocking hollow body, the invention proposes a method for unblocking the movement of the hollow bodies which has an unblocking step which consists in applying to the hollow body of the blocked row a pushing force in opposition to the direction of travel, to separate the jammed portion of the blocking hollow body in relation to the stationary surface and thus to allow the blocking hollow body to find naturally under the influence of gravity its freely suspended position in the chute.

Furthermore, this pushing force in the opposite direction also makes it possible to separate the hollow bodies of the row from one another, facilitating the return of the blocking hollow body to its freely suspended position without being hindered by the following hollow bodies.

According to a first embodiment of the invention, shown in FIGS. 2 to 6 is a conveyor 19 that forms a device for aligning into a row and uprighting preforms 10, which conveyor 19 is intended to be part of an installation (not shown) for manufacturing and/or processing containers made of thermoplastic material by forming, particularly by blow molding or by stretch blow molding.

The conveyor 19 has mainly a centrifuge bowl 20. A following conveying device 22 is positioned at the exit from the bowl 20 to convey the preforms 10 that are aligned and uprighted in freely suspended position.

The centrifuge bowl 20 has a horizontal circular plate 24 rotating around a central vertical axis "B". The rotating plate 24 thus has a circular peripheral edge 25. The upper surface of the rotating plate 24 delimits, vertically downward, the interior of the centrifuge bowl 20. Thus, the plate 24 forms the bottom of the bowl 20.

The rotating plate 24 is driven in rotation, preferably at a constant speed, in a direction of travel, here in a clockwise direction indicated by the arrow "F1" of the figures, for example by a motor (not shown) which is positioned under the rotating plate 24. The speed of rotation is, for example, controlled in such a way that the peripheral edge 25 of the rotating plate 24 moves between 2 and 3 m/s.

In the example illustrated, the rotating plate 24 is carried by a support table 26. The centrifuge bowl 20 is delimited radially toward the outside by a stationary peripheral railing 28 which here is attached to the support table 26. This railing 28 has particularly for its first function to retain the preforms 10 thrown outward by the centrifugal force produced by the rotation of the rotating plate 24, and for its second function to guide the movement of the preforms 10 to an output passage 32 from the bowl 20 to the following conveying device 22.

The preforms 10 are released in bulk onto the rotating plate 24 by means of a stationary outlet 30. The outlet 30 here is arranged in the center of the rotating plate 24. The outlet 30 is designed to release the preforms 10 in bulk, radially in the direction of a first receiving portion 28A of the railing 28 in an angular first sector 20A of the bowl 20.

During the operation of the conveyor 19, during a first phase, known as releasing, the preforms 10 that are released in bulk by the outlet 30 are thrown radially against the receiving portion 28A of the railing 28 under the combined influence of their sliding radial speed at the exit from the outlet 30 and of the centrifugal force produced by the rotation of the rotating plate 24. The preforms 10 are constantly held radially against the railing 28 by centrifugal force.

Then, during a second phase, the preforms 10 are driven in purely tangential movement in the direction of the arrow "F1" by the rotating plate 24 along the railing 28.

Thus, the majority of the preforms 10 find themselves aligned tangentially against the railing 28, with their main axis "A" oriented approximately tangentially to their direction of travel. The distance between two successive aligned preforms 10 is random because the rotating plate 24 is perfectly flat and does not have notches for indexing the preforms 10. The preforms 10 can thus be in contact by their ends under the influence of the centrifugal force which forces the preforms 10 to slide in relation to one another.

At this stage, the preforms 10 are oriented randomly neck 14 upward or downward with no impact on the rest of the method.

The bowl 20 has an angular conveying sector 20B in which the thus aligned preforms 10 are uprighted into a freely suspended position and then conveyed in a row in this position to the following conveying device. At the downstream end of this angular conveying sector 20B, the output passage 32 of the preforms 10 is open in the railing 28 to make it possible to guide the preforms 10 that are correctly aligned and uprighted in freely suspended position to the following conveying device 22.

Figure 4:
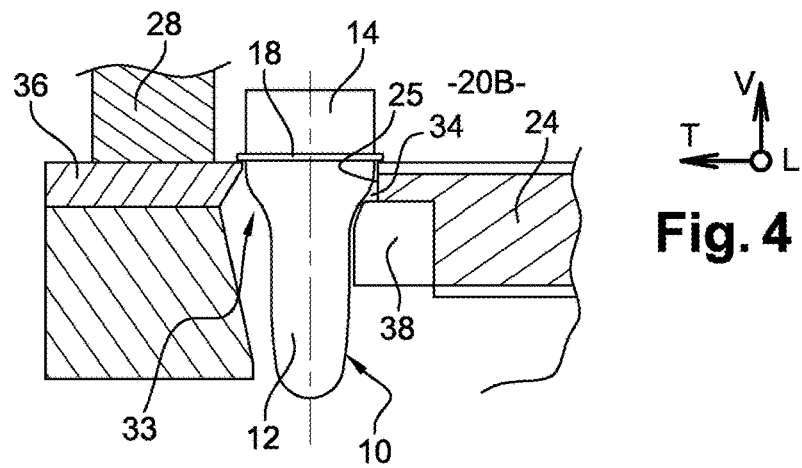
FIG. 4 is a radial cutaway view along the cutting plane 4-4 of FIG. 6 which represents a sector of the centrifuge bowl of FIG. 2 which has a channel delimited by a stationary rail and by the rotating plate of the centrifuge bowl as well as a preform that is aligned and uprighted.

As shown in FIG. 4, the angular conveying sector 20B has a chute 33 which is equipped with a peripheral channel 34 formed by radial separation of the railing 28 relative to the peripheral edge 25 of the rotating plate 24.

All along the angular conveying sector 20B, the railing 28 has a stationary support rail 36 of the support surface 16. The rail 36 extends in radial projection toward the interior in the same area as the upper surface of the rotating plate 24.

The channel 34 is thus delimited transversely between the stationary rail 36 of the railing and the mobile peripheral edge 25 of the plate 24. This channel 34 extends to the output passage 32 of the preforms 10.

As illustrated in FIG. 4, the preforms 10 can be supported by their support surface 16, formed in the present case by their collar 18 which then rests, at two diametrically opposed points, on the horizontal upper surface of the rotating plate 24, on the one hand, and on a horizontal upper surface of the rail 36, on the other hand, the body 12 of the preforms 10 being under the level of the rotating plate 24 across the channel 34. The two support points are aligned diametrically, therefore transversely.

A third phase follows, known as uprighting, not shown, in which the aligned preforms 10 during the second phase arrive horizontal while being aligned in a row along the railing 28, their main axis "A" oriented tangentially.

Figure 5:
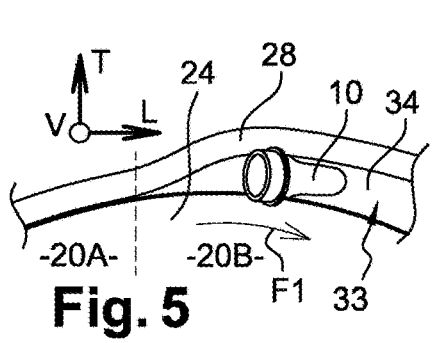
FIG. 5 is a top view which represents a preform during uprighting in the channel of the chute.
Figure 6:
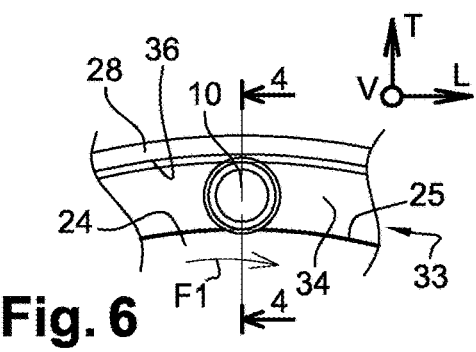
FIG. 6 is a top view which represents a preform guided in the channel in a direction of travel.
Figure 7:
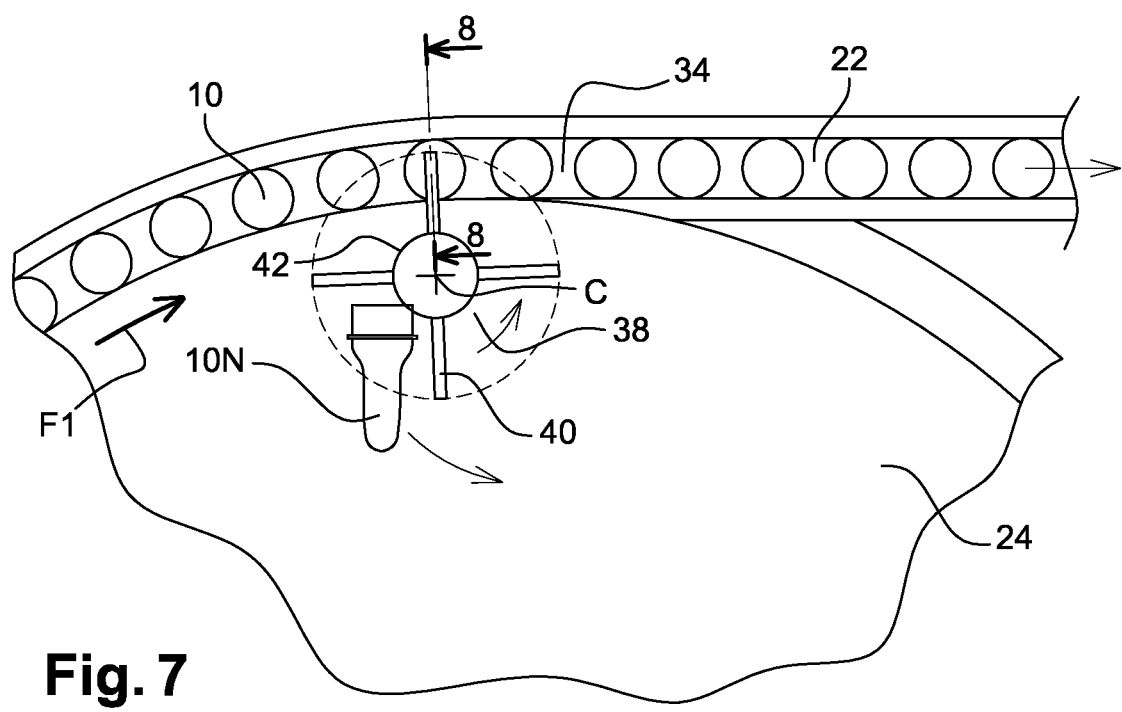
FIG. 7 is a top view which represents a downstream portion of the chute of the device of FIG. 2 and which has a disentangling wheel in the process of separating a preform occupying an incorrect position.
Figure 8:
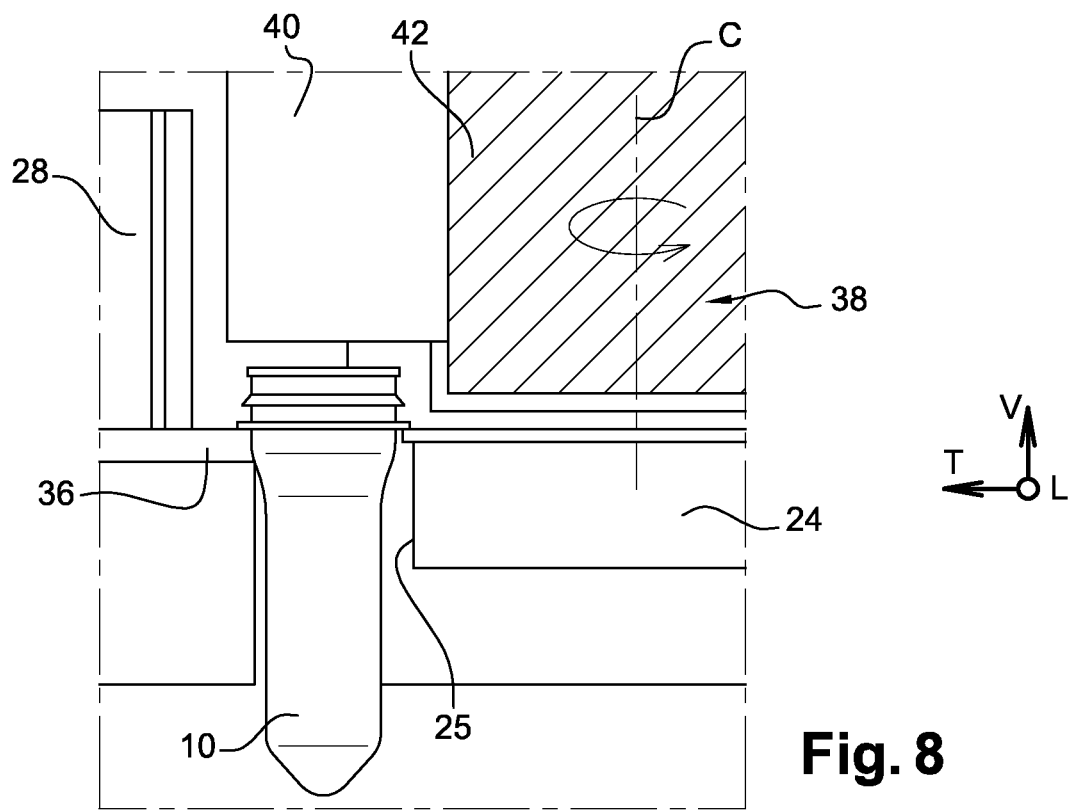
FIG. 8 is a radial cutaway view of the bowl along the cutting plane 8-8 of FIG. 7 which represents the disentangling wheel of FIG. 7 allowing the passing of a short-necked preform occupying a freely suspended position.

With reference to FIGS. 5 and 6, when the body 12 of each preform 10 arrives above the channel 34, the body 12 begins to fall, thus causing the preform 10 to swing around a radial axis passing through the support points of the support surface 16, in the present case the collar 18, of the preform 10. The swinging continues until the main axis "A" of the preform 10 is vertical, possibly after several swings around the radial axis. The preform 10 is then supported by its support surface 16 resting jointly on the rail 36 and on the rotating plate 24, as indicated in FIG. 7. The preform 10 is thus uprighted, neck 14 upward. A preform 10 thus uprighted is guided externally by the rail 36 of the railing 28, and it is guided internally by the peripheral edge 25 of the rotating plate 24.

The preforms 10 thus uprighted normally occupy a freely suspended position, i.e., a correct position, in which they are able to be transferred to the following conveying device 22. They are driven in rotation around their main axis by friction against the peripheral edge 25 of the plate 24 by sliding on the rail. The preforms 10 are thus moved around the bowl 20 in the direction "F1" of rotation of the rotating plate 24 by rolling against the peripheral railing 28.

Nevertheless, it happens that some preforms 10 occupy an incorrect position. For example, some preforms 10N are inserted into one another and travel with the freely suspended preforms 10 or, also, preforms 10N are horizontal on the necks 14 of freely suspended preforms 10. The preforms 10N occupy incorrect positions such that it is impossible to reposition them correctly quickly and automatically.

Also, it happens that preforms 10 occupy a horizontal position above the channel 34 at the same height as the necks 14 of the freely suspended preforms 10. These latter horizontal preforms 10 are generally prevented from swinging to their freely suspended position because of the presence of the adjacent preforms 10.

The preforms 10 in freely suspended position are thus routed in a row to a downstream end section of the chute 33 at the entrance of which the preforms 10N occupying an incorrect position are sent back directly to the center of the bowl by sorting means such as a disentangling wheel 38.

The sorting means make it possible to eject actively preforms 10N occupying an incorrect position to the center of the bowl to allow their direct return into the flow of the preforms 10 arriving in bulk through the outlet 30. The adverb "actively" signifies that the sorting means are able to provide to the preforms 10N occupying an incorrect position a pushing force such that they quickly return to the center of the bowl.

The sorting means in particular have a wheel 38 with paddles 40, known as a disentangling wheel 38 which is positioned upstream from the output passage 32 in the direction "F1" of rotation of the rotating plate 24. In the embodiment shown in FIG. 7, the disentangling wheel 38 is more particularly positioned directly upstream from the output passage 32, so that the ejected preforms 10N are thrown directly against the receiving portion 28A of the railing 28 without risking reaching the output passage 32.

The disentangling wheel 38 has a central shaft 42 from which the paddles 40 extend radially. The disentangling wheel 38 here rotates around a vertical axis "C". The space swept by the paddles 40 is thus cylindrical with an axis "C". This swept space is shown in a dashed lines in FIG. 7.

Each paddle 40 sweeps a space which extends vertically above the channel 34 at a vertical distance slightly higher than the height of a preform 10 neck 14 (the height being determined between the collar or the opening, or rim of the preform). Thus, each paddle 40 is positioned to pass vertically above and near the neck 14 of the preforms 10 in freely suspended position, but with respect to the neck 14 of a possible preform 10N inserted into another or with respect to a preform 10N resting horizontal on freely suspended preforms. Thus, a paddle 40 can come into contact with inserted or horizontal, therefore incorrectly positioned, preforms 10N.

This makes it possible not only to eject the poorly positioned preforms 10N, but also to guarantee that these preforms 10N will be ejected without the possibility of passing under the paddles 40. This also makes it possible to prevent the ejected preforms 10N from coming back in the direction of the output passage 32.

The shaft 42 of the wheel is positioned transversely at a transverse distance from the peripheral edge 25 of the plate 24 making possible the passing of the collar 18 of a freely suspended preform 10.

Figure 9:
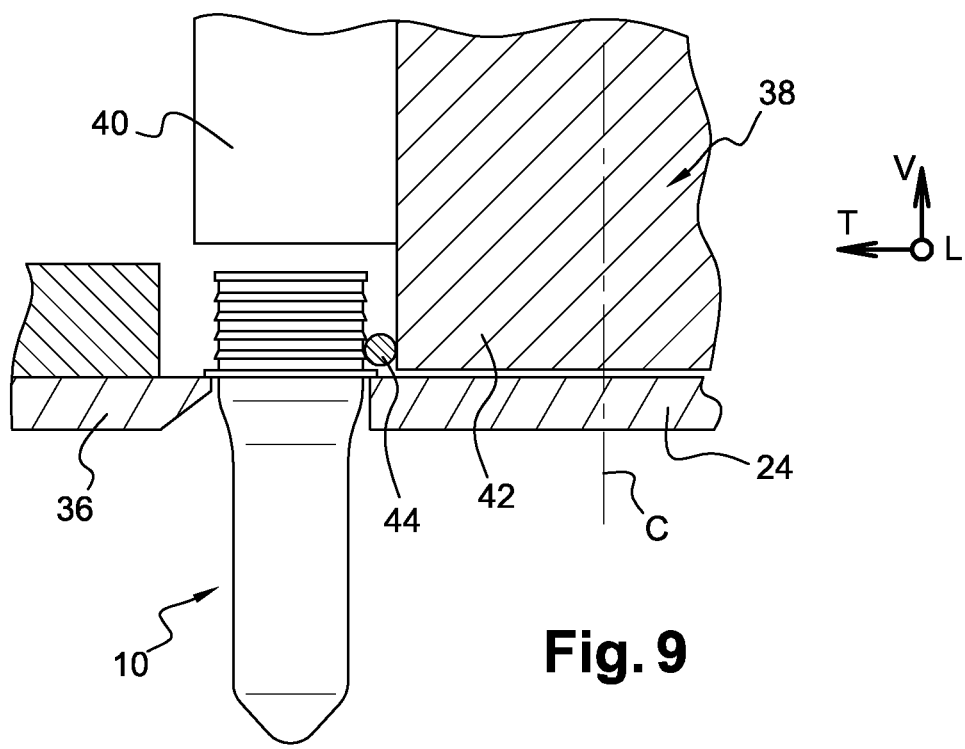
FIG. 9 is a view similar to that of FIG. 8 which represents the disentangling wheel of FIG. 7 allowing the passing of a long-necked preform occupying a freely suspended position.

As shown in FIG. 9, some preforms 10 referred to as "having a long neck 14" have a neck 14 whose height, as defined previously, is greater than the diameter of their collar 18. To be able to prevent the passing of such preforms 10 which would occupy a horizontal position, it is envisaged to position a ring forming a radially projecting surface 44 around the shaft 42 of the disentangling wheel 38, under the paddles 40. This ring forming the surface 44 consists of, for example, an O-ring made of elastomer material.

Figure 10:
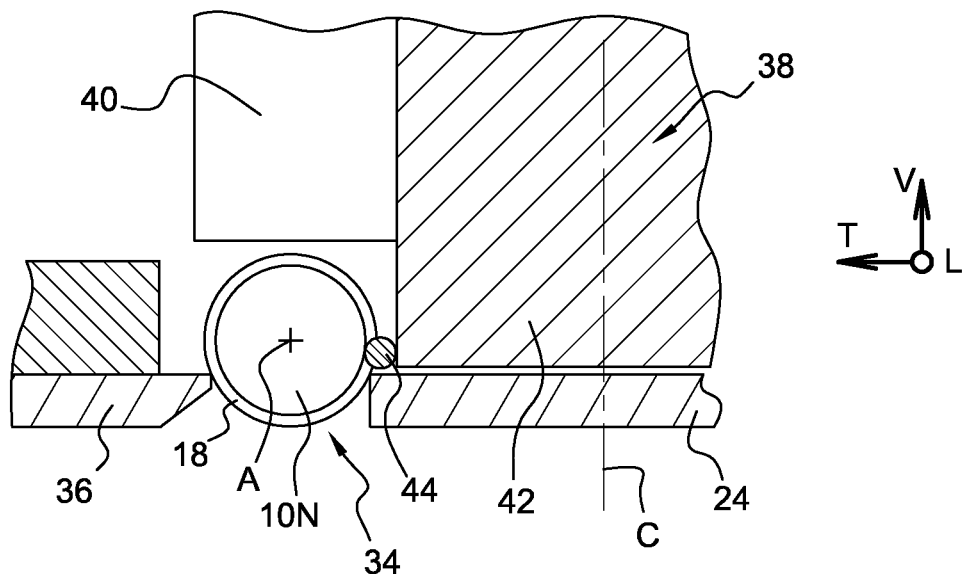
FIG. 10 is a cutaway view along the cutting plane 10-10 of FIG. 11 which represents the disentangling wheel of FIG. 9 preventing the passing of a long-necked preform occupying a horizontal position.

Such a surface 44 formed by the ring makes it possible to restrict the passing section left by the shaft 42 for the necks 14, while letting pass the freely suspended preforms 10 whose collar 18 passes between the plate 24 and the surface 44 of the ring (FIG. 9). The preforms 10 occupying an incorrect position are jammed by contact of their collar 18 with the surface 44 of the ring (FIG. 10). The outer surface of the ring thus forms a stationary surface 44, for sorting.

Figure 11:
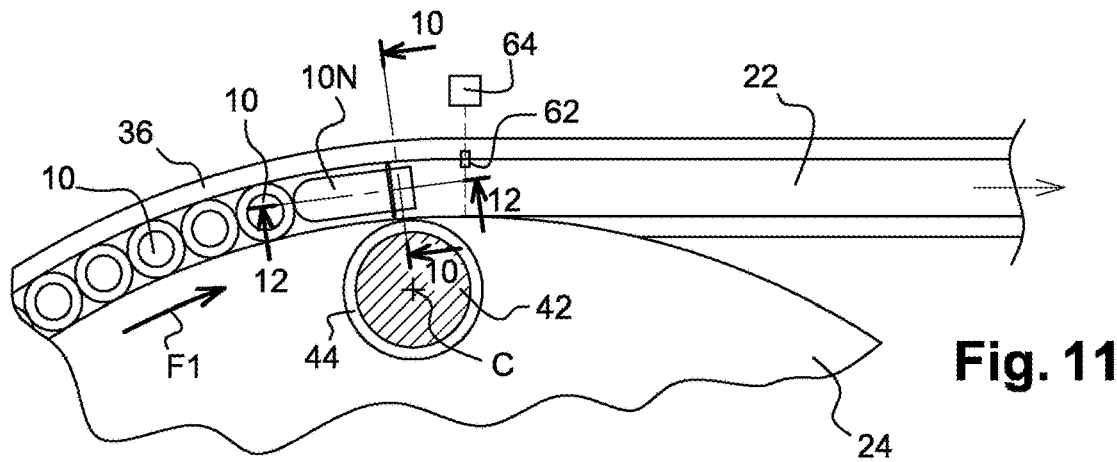
FIG. 11 is a top view which represents a horizontal preform which is jammed by the disentangling wheel and which blocks the movement of the following preforms in the chute pushed by the rotation of the plate of the centrifuge in a direction of travel.
Figure 12:
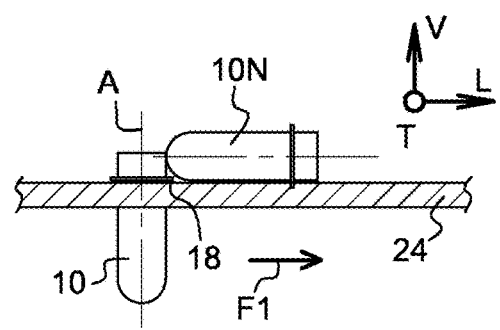
FIG. 12 is a cutaway view along the cutting plane 12-12 of FIG. 11.
Figure 14:
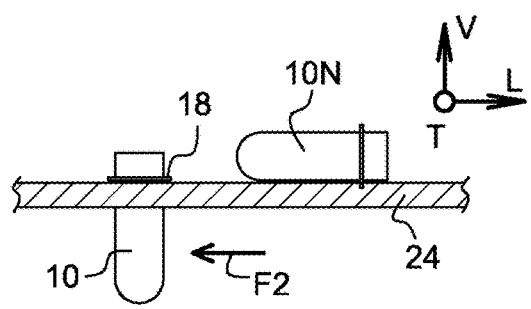
FIG. 14 is a cutaway view along the cutting plane 14-14 of FIG. 13 which represents the horizontal preform and the following preform moving in reverse direction from the direction of travel to be separated from one another.

If the majority of the preforms 10 occupying an incorrect position are ejected toward the center of the bowl by the paddles 40 of the disentangling wheel, some preforms 10N occupying a blocking position remain jammed, however, against the surface 44 of the ring. These preforms 10N in blocking position which are stopped by the surface 44 of the ring block the movement of the following preforms 10, as is shown in FIG. 11. The preform 10N in blocking position is, for example, held in its horizontal position by pressing of its closed end on the collar 18 of the following preform 10, as illustrated in FIG. 12.

The invention proposes applying a pushing force to the preforms 10 of the blocked row that goes opposite the direction "F1" of normal movement. This pushing force is produced by a brief reversal of the direction of rotation of the rotating plate, as shown by the arrow "F2" of FIG. 13. Thus, when a hollow body is jammed against the sorting surface, the rotation of the plate is briefly reversed, to make it possible for the preform 10N in blocking position to be separated from the sorting surface 44, here of the ring, by backing up along the chute 33.

Figure 15:
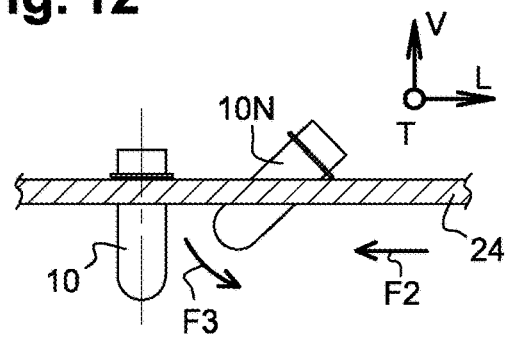
FIG. 15 is a view similar to that of FIG. 14 which represents the horizontal preform in the process of swinging toward its freely suspended position.

This reversal of direction of rotation of the plate 24 also triggers the backing up along the chute 33 of the preforms 10 accumulated behind the preform 10N. Thus, this preform 10N is also separated longitudinally from the adjacent following preform 10. The preform 10N is therefore no longer blocked in its horizontal position by the collar 18 of the adjacent preform 10. As shown in FIG. 15, the preform 10N is then free to swing automatically to its freely suspended position under the influence of gravity, as indicated by the arrow "F3".

It was found that a brief return backward of the hollow bodies, for example for several seconds or fractions of seconds, was enough to make it possible for a hollow body occupying its blocking position to swing automatically to its freely suspended position under the influence of its weight when its position permits it.

Figure 16:
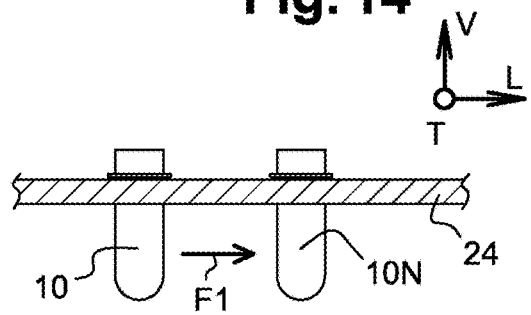
FIG. 16 is a view similar to that of FIG. 14 in which the horizontal preform is henceforth in a freely suspended position, the rotating plate again in the direction of travel.

As shown in FIG. 16, the rotation of the plate 24 is again driven in its normal direction "F1". Since the preform 10N is at present in a freely suspended position, it passes across the passage left free by the disentangling wheel 38 in the direction of the following conveying device 22.

According to a second embodiment of the invention, which is shown in FIGS. 17 to 21, the conveyor 19 consists of a chute 33 having two parallel stationary rails 46 between which the hollow bodies, here preforms 10, are received in their freely suspended position. The two rails 46 here are arranged in a horizontal plane.

The rails 46 thus transversely delimit a channel 34. The body 12 of each preform 10 is positioned under the rails 46 while the neck 14 is positioned above the rails 46. The preform 10 rests freely by its support surface 16 on each rail 46 on both sides of the channel 34, as shown in FIG. 17.

The drive means here are reversible, i.e., they can be controlled so as to reverse the direction of travel of the preforms 10 in the chute 33.

In the example shown in FIGS. 17 and 18, the drive means here consist of at least one brush band 48 moving parallel to the chute 33. This brush band 48 is positioned under the rails 46 at the height of the body 12 of the preforms 10. The brush band 48 here is arranged in a closed loop so that a drive strand of the brush band 48 is positioned near the bodies 12 of the preforms 10. The brush band 48 is stretched around two pinions 50 that rotate around a vertical axis. One of the pinions 50 is a driven pinion so as to drive the brush band 48.

The brush band 48 has flexible bristles 52 of the drive strand extending transversely so as to extend across the path of the bodies 12 of the preforms 10, as illustrated in FIG. 17. The bodies 12 of the preforms 10 are thus taken between the flexible bristles 52 of the brush bands 48. When the brush band 48 is driven by the drive pinion 50, the bristles 52 push the preforms 10 toward the direction "F1" of travel. The flexibility of the bristles 52 makes it possible to avoid damaging the bodies 12 of the preforms 10.

The chute 33 is equipped, at least on a downstream end section, with a retention surface 54, horizontal, which extends above the necks 14 of the preforms 10 parallel to the channel 34. The distance between the top of the necks and the retention surface 54 is small enough to limit the range of swing of the preforms 10 by contact with an end edge, known as the rim, of the necks 14, as illustrated in FIGS. 17 and 19. The retention surface 54 is stationary in relation to the rails 46. The retention surface 54 thus forms a ceiling which prevents the preforms 10 from leaving the chute 33.

It happens that in a situation of excessive swinging of a preform 10, the free end edge of its neck 14 (its rim) finds itself in contact with the retention surface 54, as is illustrated in FIG. 20. In the majority of cases, the neck 14 bounces against the retention surface 54 and the preform 10 comes back to its freely suspended position.

However, in some cases, the neck 14 remains jammed against the retention surface 54. The preforms 10 are then blocked, while the brush band 48 continues to rotate, the bristles 52 of the brushes bending while brushing the immobilized bodies 12. The neck 14 of the preform 10 is held jammed against the retention surface 54 under the influence of the continuous pushing force of the brush bristles 52 which tend to cause the preform 10 to pivot around its support points on the rails 46. This jamming effect is then reinforced by the continuous pushing force of the preforms 10 that are accumulated behind this blocked preform 10.

It is found that by briefly reversing the direction of travel of the brush bands 48, as indicated by the arrow "F2" of FIG. 21, during an unblocking step, the brush bristles 52 apply a swinging force on the preform 10 which thus tends to separate from the retention surface 54, as indicated by the arrow "F3" of FIG. 21, the cause of the blocking thus being eliminated. The neck 14 is thus free to pivot to its freely suspended position.

Furthermore, the preforms 10 that are accumulated behind the blocked preform 10 are separated rearward in relation to the blocked preform 10 to make it possible for it to swing freely.

After this brief reversal, for example on the order of a second, the movement of the brush bands 48 is again driven in the normal direction "F1" of travel to make it possible for the preforms 10 to continue normally their sliding downstream in the chute 33.

Instead of brush bands 48, bands could be used with a friction coefficient that is low enough not to mark the preforms, but high enough to drive the preforms in one direction or the other as necessary.

Figure 22:
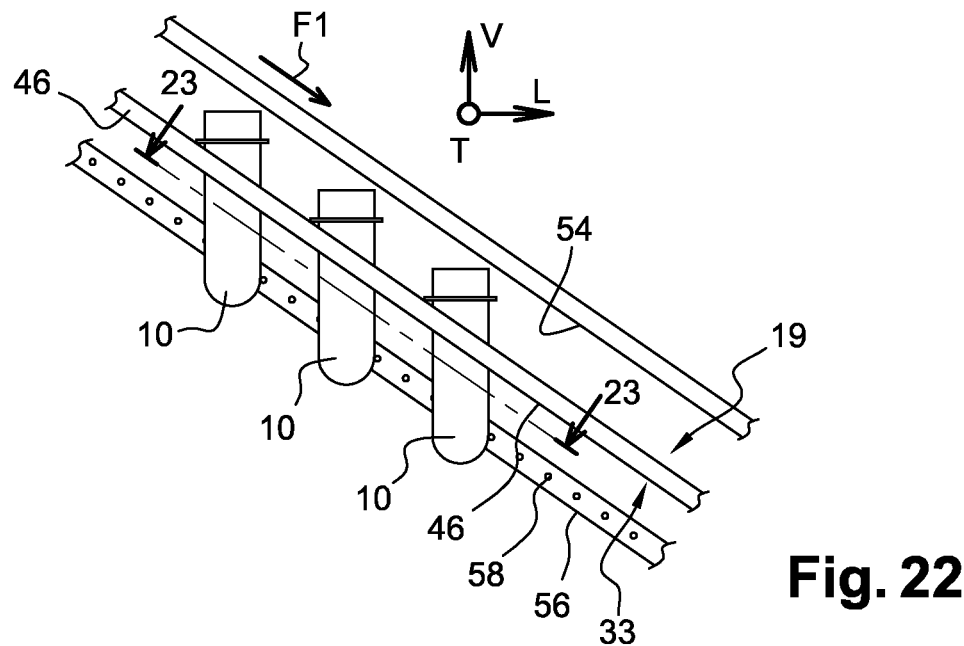
FIG. 22 is a side view which represents a conveyor able to use the method implemented according to a third embodiment of the invention.
Figure 23:
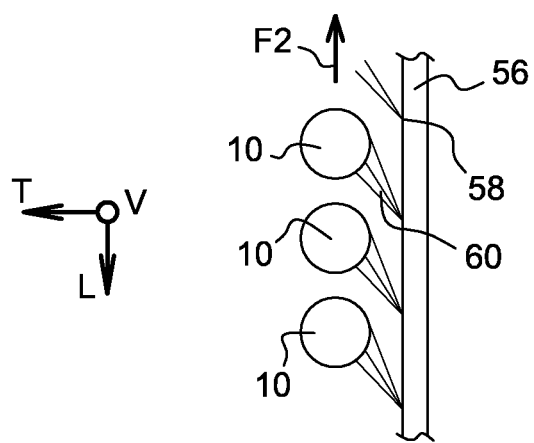
FIG. 23 is a view along the cutting plane 23-23 of FIG. 22 which represents a ramp of blowing nozzles pushing the preforms in a direction opposite to the direction of travel.

According to a third embodiment of the invention which is shown in FIGS. 22 and 23, the conveyor 19 consists of a chute 33 having two parallel stationary rails 46 between which each hollow body is received. The chute 33 is thus made in a manner similar to that of the second embodiment.

However, in this embodiment, the drive means of the preforms 10 are not reversible.

Thus, in the example shown in FIG. 22, the rails are inclined to make it possible for the hollow bodies to slide to the bottom of the chute 33 under the influence of gravity.

According to a variant, not shown, of the invention, the rails are horizontal and the movement means consist of a ramp of nozzles for blowing jets of compressed air on the hollow bodies toward the direction of travel, the ramp being parallel to the chute.

According to this embodiment, the conveyor 19 has drive means dedicated to reverse the direction of travel of the preforms 10.

In the example shown in FIGS. 22 and 23, the unblocking pushing force is accomplished by blowing jets of compressed air on a portion of the hollow bodies against the direction of travel of the hollow bodies. For this purpose, a ramp 56 of blowing nozzles 58 is positioned parallel to the chute 33. The nozzles are able to blow a jet 60 directed toward the body 12 of the preform 10. The jet 60 is more particularly inclined rearward to act in a manner similar to the brushes of the second embodiment during the unblocking step, as is indicated in FIG. 23.

Thus, during the unblocking step, the ramp 56 is controlled so as to issue jets 60 to push back the bodies of the preforms 10 upstream in the chute 33. In a manner similar to that which has been described for the second embodiment, a blocked preform 10N is thus free to return to its freely suspended position.

Figure 13:
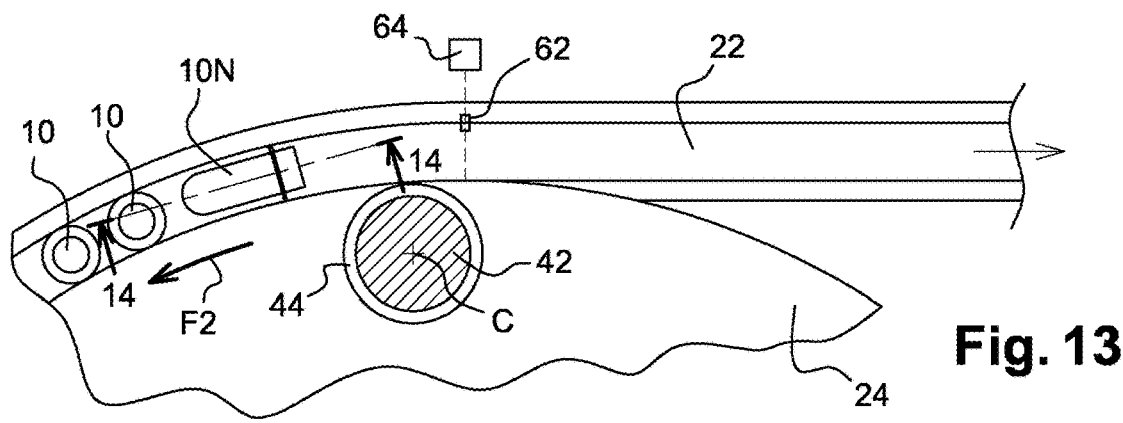
FIG. 13 is a view similar to that of FIG. 11 which represents the plate rotating in a reverse direction to the direction of travel to separate the horizontal preform from the disentangling wheel.

In all the embodiments described previously, the method advantageously has a previous step of automatic detection of the blocking of the movement of the preforms 10, by means of a sensor 62 for passage of the preforms 10, as illustrated in FIGS. 1, 13 and 20 as applied to the first and second embodiments of the invention. The sensor 62 is connected to an electronic control unit 64 which can automatically control the triggering of an unblocking step when an interruption of the travel of the preforms 10 is detected.

It concerns, for example, an optical sensor 62 which emits transversely a ray across the passage of the preforms 10. When no preform 10 blocks the ray for a predetermined period, this is interpreted by the electronic control unit 64 as the detection of a blocked preform 10N.

The electronic control unit 64 then automatically initiates the unblocking step. An automatic triggering of the unblocking step avoids having an operator intervene, even remotely, to manage the pushing force.

However, when the movement of the hollow bodies remains blocked at the completion of the unblocking step, a step for ejecting the blocking hollow body is triggered or a warning is issued aimed at an operator to perform a manual unblocking operation.

The automatic unblocking method performed according to the teachings of the invention thus makes it possible to reduce the time of blocking of the hollow bodies while keeping the majority of the hollow bodies in their row.

The method has been described as applied to preforms. It will be understood that it is also applicable to other types of hollow bodies, such as containers.

The invention claimed is:

1. Method for unblocking the movement of hollow bodies, particularly preforms (10) made of thermoplastic material, moving in a row in a conveyor (19) having:
   a guiding chute (33) in which each hollow body is intended to occupy a freely suspended position; the chute (33) having two parallel stationary rails (46) between which each hollow body is received in its freely suspended position;
   means for continuously driving the hollow bodies along the chute (33) in a direction of travel;
   a hollow body that can occupy a position in which it finds itself jammed against a stationary surface (44, 54) of a supplemental element of the chute and thus to be a jammed first hollow body causing the blocking of the movement of the hollow bodies that accumulate behind the jammed first hollow body;
   the method comprising an unblocking step which consists in applying to the hollow bodies of the blocked row an unblocking pushing force against the direction of travel to separate the blocking hollow body relative to the stationary surface (44, 54) and to make it possible for the jammed first hollow body to swing to its freely suspended position in the chute (33).

2. Method according to claim 1, wherein the unblocking pushing force is produced by a brief reversal of the direction of operation of the drive means.

3. Method according to claim 1, further comprising a previous step for detection of the blocking of the travel of the hollow bodies, by means of a sensor (62) for passage of the hollow bodies, and wherein the unblocking pushing force is triggered automatically when a blocking is detected by the sensor (62).

4. Method according to claim 1, wherein the drive means consist of at least one brush band (48) moving parallel to the chute (33) whose bristles (52) push the hollow bodies toward the direction (F1) of travel, and wherein the unblocking pushing force is achieved by reversing the direction of travel of the brush bands (48) during the unblocking step.

5. Method according to claim 1, wherein the chute (33) has a stationary surface consisting of an upper retention surface (54) extending above the necks (14) of the hollow bodies.

6. Method according to claim 1, wherein the conveyor (19) consists of a device for aligning in a row and for uprighting preforms that have a centrifuge bowl (20) having a horizontal circular plate (24) rotating around a vertical axis (B);
   the chute (33) having a stationary peripheral rail (36) that retains the preforms (10) projected by a centrifugal force and a radially dedicated channel (34) between the rail (36) and a peripheral edge (25) of the plate (24) to receive each preform (10) in its freely suspended position between the rail (36) and the peripheral edge (25) of the plate (24);
   a stationary surface consisting of a sorting surface (44) that is positioned in the bowl (20) relative to the chute

(33) to prevent by a stop the passing of preforms (10) that do not occupy the freely suspended position;

a means for initiating movement consisting of the rotation of the plate (24), the unblocking pushing force is triggered by reversal of the rotation of the plate (24) when a preform (10) is jammed against the sorting surface (44) to make it possible for it to swing in the channel (34) in a freely suspended position.

7. Method according claim 1, wherein the unblocking pushing force is achieved by blowing jets (60) of compressed air on a portion of the hollow bodies against the direction (F1) of travel of the hollow bodies using a first ramp (56) of blowing nozzles that is parallel to the chute (33).

8. Method according to claim 1, wherein the rails (46) are inclined to make it possible for the hollow bodies to slide toward the bottom of the chute (33) under the influence of gravity.

9. Method according to claim 7, wherein the movement means consist of a second ramp of nozzles for blowing jets of compressed air on the hollow bodies toward the direction of travel, the ramp being parallel to the chute.

10. Method according to claim 2, further comprising a previous step for detection of the blocking of the travel of the hollow bodies, by means of a sensor (62) for passage of the hollow bodies, and wherein the unblocking pushing force is triggered automatically when a blocking is detected by the sensor (62).

11. Method according to claim 2, wherein the drive means consist of at least one brush band (48) moving parallel to the chute (33) whose bristles (52) push the hollow bodies toward the direction (F1) of travel, and wherein the unblocking pushing force is achieved by reversing the direction of travel of the brush bands (48) during the unblocking step.

12. Method according to claim 3, wherein the drive means consist of at least one brush band (48) moving parallel to the chute (33) whose bristles (52) push the hollow bodies toward the direction (F1) of travel, and wherein the unblocking pushing force is achieved by reversing the direction of travel of the brush bands (48) during the unblocking step.

13. Method according to claim 2, wherein the chute (33) has a stationary surface consisting of an upper retention surface (54) extending above the necks (14) of the hollow bodies.

14. Method according to claim 3, wherein the chute (33) has a stationary surface consisting of an upper retention surface (54) extending above the necks (14) of the hollow bodies.

15. Method according to claim 2, wherein the conveyor (19) consists of a device for aligning in a row and for uprighting preforms that have a centrifuge bowl (20) having a horizontal circular plate (24) rotating around a vertical axis (B);

the chute (33) having a stationary peripheral rail (36) that retains the preforms (10) projected by a centrifugal force and a radially dedicated channel (34) between the rail (36) and a peripheral edge (25) of the plate (24) to receive each preform (10) in its freely suspended position between the rail (36) and the peripheral edge (25) of the plate (24);

a stationary surface consisting of a sorting surface (44) that is positioned in the bowl (20) relative to the chute (33) to prevent by a stop the passing of preforms (10) that do not occupy the freely suspended position;

a means for initiating movement consisting of the rotation of the plate (24), the unblocking pushing force is triggered by reversal of the rotation of the plate (24) when a preform (10) is jammed against the sorting surface (44) to make it possible for it to swing in the channel (34) in a freely suspended position.

16. Method according to claim 3, wherein the conveyor (19) consists of a device for aligning in a row and for uprighting preforms that have a centrifuge bowl (20) having a horizontal circular plate (24) rotating around a vertical axis (B);

the chute (33) having a stationary peripheral rail (36) that retains the preforms (10) projected by a centrifugal force and a radially dedicated channel (34) between the rail (36) and a peripheral edge (25) of the plate (24) to receive each preform (10) in its freely suspended position between the rail (36) and the peripheral edge (25) of the plate (24);

a stationary surface consisting of a sorting surface (44) that is positioned in the bowl (20) relative to the chute (33) to prevent by a stop the passing of preforms (10) that do not occupy the freely suspended position;

a means for initiating movement consisting of the rotation of the plate (24), the unblocking pushing force is triggered by reversal of the rotation of the plate (24) when a preform (10) is jammed against the sorting surface (44) to make it possible for it to swing in the channel (34) in a freely suspended position.

17. Method according to claim 4, wherein the conveyor (19) consists of a device for aligning in a row and for uprighting preforms that have a centrifuge bowl (20) having a horizontal circular plate (24) rotating around a vertical axis (B);

the chute (33) having a stationary peripheral rail (36) that retains the preforms (10) projected by a centrifugal force and a radially dedicated channel (34) between the rail (36) and a peripheral edge (25) of the plate (24) to receive each preform (10) in its freely suspended position between the rail (36) and the peripheral edge (25) of the plate (24);

a stationary surface consisting of a sorting surface (44) that is positioned in the bowl (20) relative to the chute (33) to prevent by a stop the passing of preforms (10) that do not occupy the freely suspended position;

a means for initiating movement consisting of the rotation of the plate (24), the unblocking pushing force is triggered by reversal of the rotation of the plate (24) when a preform (10) is jammed against the sorting surface (44) to make it possible for it to swing in the channel (34) in a freely suspended position.

18. Method according to claim 5, wherein the conveyor (19) consists of a device for aligning in a row and for uprighting preforms that have a centrifuge bowl (20) having a horizontal circular plate (24) rotating around a vertical axis (B);

the chute (33) having a stationary peripheral rail (36) that retains the preforms (10) projected by a centrifugal force and a radially dedicated channel (34) between the rail (36) and a peripheral edge (25) of the plate (24) to receive each preform (10) in its freely suspended position between the rail (36) and the peripheral edge (25) of the plate (24);

a stationary surface consisting of a sorting surface (44) that is positioned in the bowl (20) relative to the chute (33) to prevent by a stop the passing of preforms (10) that do not occupy the freely suspended position;

a means for initiating movement consisting of the rotation of the plate (24), the unblocking pushing force is triggered by reversal of the rotation of the plate (24) when a preform (10) is jammed against the sorting surface (44) to make it possible for it to swing in the channel (34) in a freely suspended position.

19. Method according claim 2, wherein the unblocking pushing force is achieved by blowing jets (60) of compressed air on a portion of the hollow bodies against the direction (F1) of travel of the hollow bodies using a first ramp (56) of blowing nozzles that is parallel to the chute (33).

20. Method according claim 3, wherein the unblocking pushing force is achieved by blowing jets (60) of compressed air on a portion of the hollow bodies against the direction (F1) of travel of the hollow bodies using a first ramp (56) of blowing nozzles that is parallel to the chute (33).

\* \* \* \* \*